United States Patent [19]

Hicks, Jr.

[11] 4,315,666
[45] Feb. 16, 1982

[54] COUPLED COMMUNICATIONS FIBERS

[76] Inventor: John W. Hicks, Jr., P.O. Box 345, Southbridge, Mass. 01550

[21] Appl. No.: 21,868

[22] Filed: Mar. 19, 1979

[51] Int. Cl.³ ............................................. G02B 5/172
[52] U.S. Cl. ............................ 350/96.15; 350/96.32; 350/96.33
[58] Field of Search ............... 350/96.15, 96.16, 96.17, 350/96.20, 96.21, 96.32, 96.33

[56] References Cited

U.S. PATENT DOCUMENTS

| Re. 28,664 | 12/1975 | Miller | 350/96.32 X |
|---|---|---|---|
| 3,372,969 | 3/1968 | Snitzer | 350/96.33 |
| 3,779,628 | 12/1973 | Kapron et al. | 350/96.15 |
| 3,800,388 | 4/1974 | Börner et al. | 350/96.21 X |
| 3,823,996 | 7/1974 | Kompfner et al. | 350/96.33 |
| 3,864,018 | 2/1975 | Miller | 350/96.21 |
| 3,936,143 | 2/1976 | Sato | 350/96.21 |
| 3,950,073 | 4/1976 | Horiguchi et al. | 350/96.33 |
| 4,008,061 | 2/1977 | Ramsay | 350/96.15 X |
| 4,054,366 | 10/1977 | Barnoski et al. | 350/96.15 |
| 4,070,091 | 1/1978 | Taylor et al. | 350/96.33 X |
| 4,078,910 | 3/1978 | Dalgoutte | 350/96.21 X |
| 4,087,156 | 5/1978 | Kao et al. | 350/96.21 |
| 4,089,584 | 5/1978 | Polczynski | 350/96.15 |
| 4,113,345 | 9/1978 | Gerndt | 350/96.15 |
| 4,134,642 | 1/1979 | Kapron et al. | 350/96.33 |
| 4,135,779 | 1/1979 | Hudson | 350/96.15 |
| 4,135,780 | 1/1979 | Dyott | 350/96.15 |
| 4,165,914 | 8/1979 | Villarruel et al. | 350/96.16 |
| 4,179,185 | 12/1979 | Hawk | 350/96.16 |

FOREIGN PATENT DOCUMENTS

| 969744 | 6/1975 | Canada | 350/96.21 |
|---|---|---|---|
| 2340020 | 2/1975 | Fed. Rep. of Germany | 350/96.15 |
| 2446152 | 4/1976 | Fed. Rep. of Germany | 350/96.15 |
| 2712054 | 10/1977 | Fed. Rep. of Germany | 350/96.15 |
| 2822022 | 12/1978 | Fed. Rep. of Germany | 350/96.15 |
| 1094639 | 12/1967 | United Kingdom . | |
| 1252126 | 11/1971 | United Kingdom . | |
| 1301553 | 12/1972 | United Kingdom . | |
| 1393925 | 5/1975 | United Kingdom . | |
| 1482996 | 7/1977 | United Kingdom . | |
| 1492248 | 11/1977 | United Kingdom . | |
| 1524004 | 9/1978 | United Kingdom . | |
| 2005046 | 4/1979 | United Kingdom . | |

OTHER PUBLICATIONS

Kao et al., "Fiber Connectors, Splices and Couplers", Conf. on Physics of Fiber Optics, U. of Rh. Isl. (1978), published in *Fiber Optics Advances in Research and Development*, edited by Bendow et al., Plenum Press (1979), section 5.2.1: Diffusion Couplers, pp. 474–478.

*Primary Examiner*—John D. Lee
*Attorney, Agent, or Firm*—Wolder, Gross & Yavner

[57] ABSTRACT

A coupling structure for coupling light intelligence between fiber optic elements. Both abuttment and lateral coupling structures are presented.

45 Claims, 47 Drawing Figures

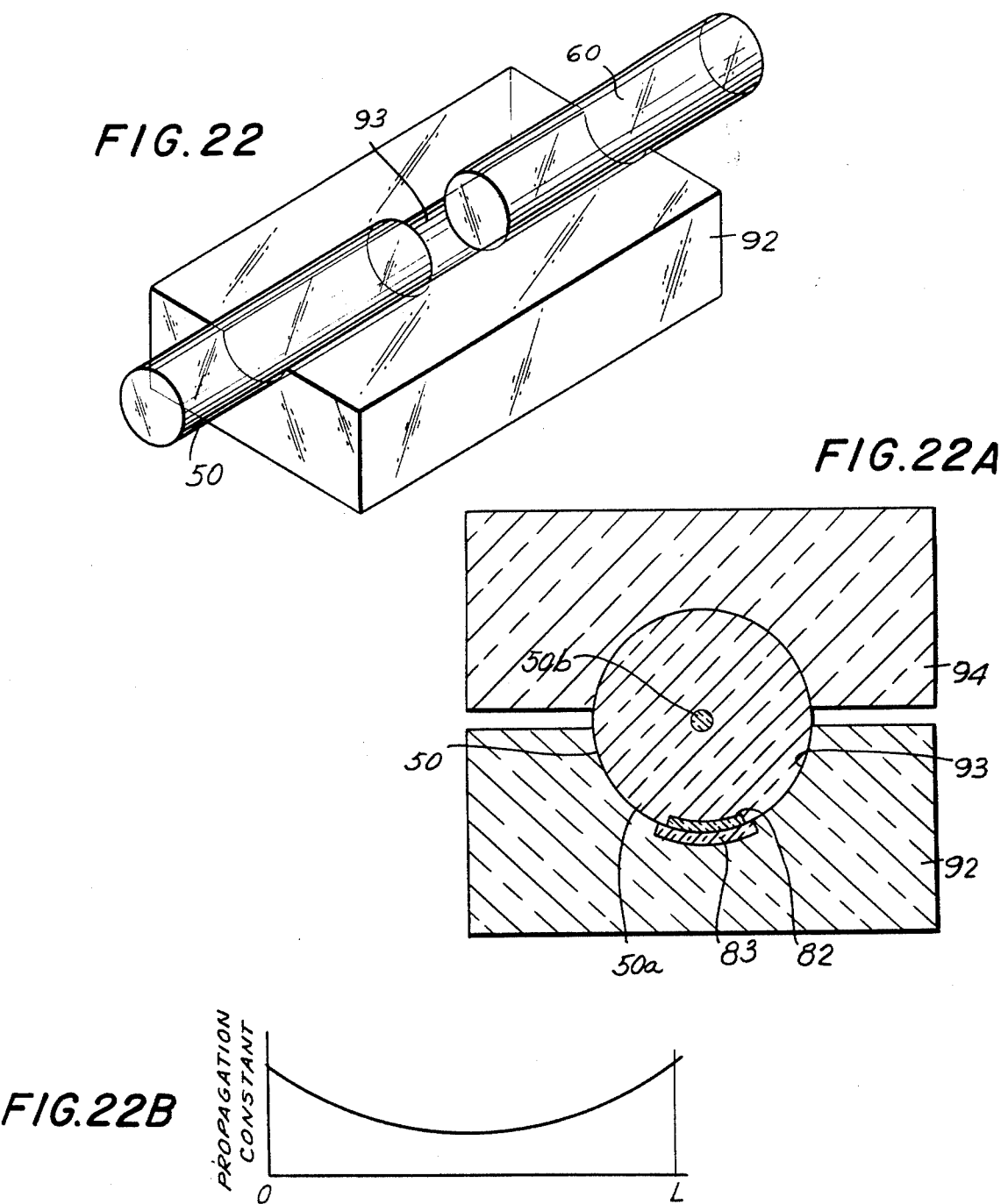
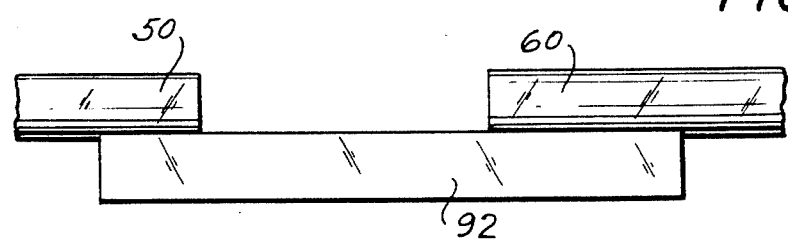

FIG. 23
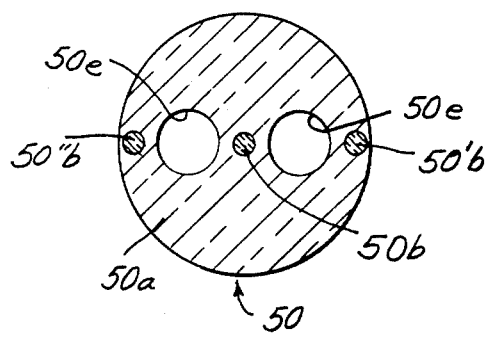
FIG. 24
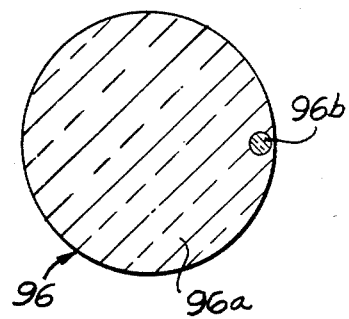
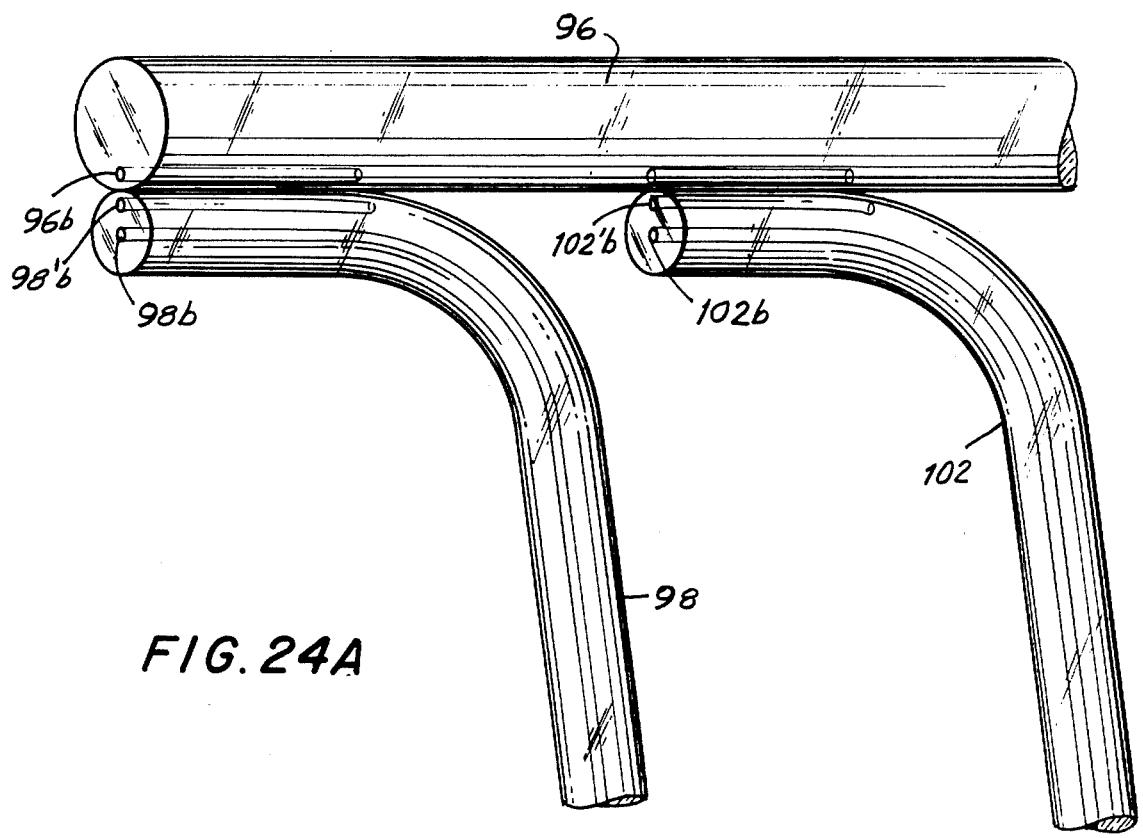
FIG. 24A

FIG. 25
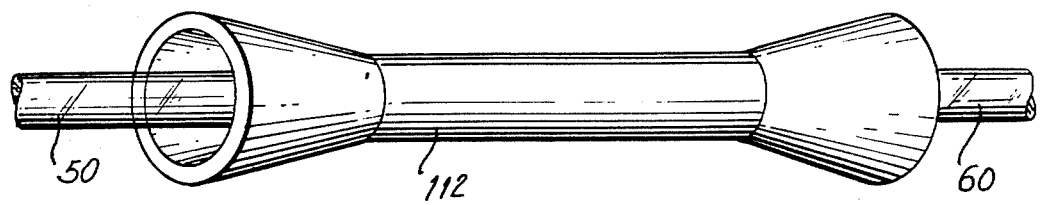
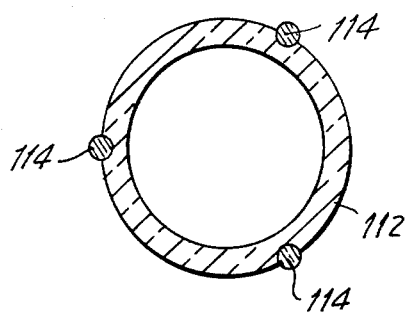
FIG. 25A
FIG. 26
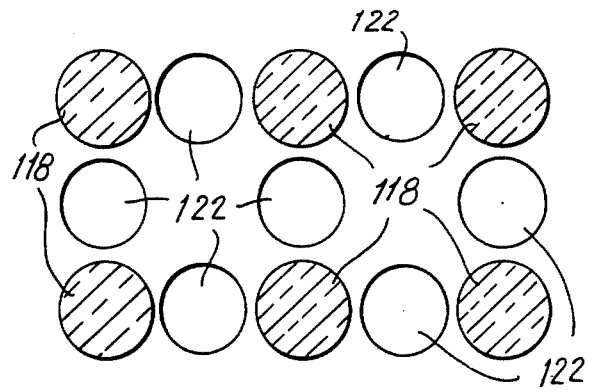
FIG. 26A
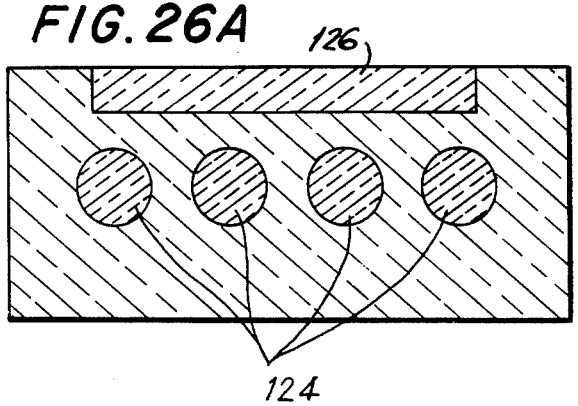
FIG. 26B
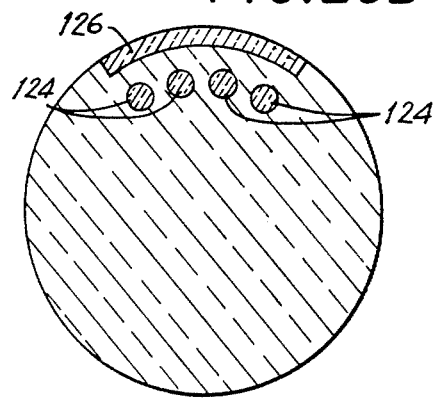

COUPLED COMMUNICATIONS FIBERS

During the past 25 years, approximately, the phenomenon of fiber optics light guidance has matured to the point where such devices are actually used for communication purposes with respect to useful intelligence carried by the light. At first, the phenomenon had importance mainly in guiding light from one point to the other without significant light loss and such that the light could be guided around bends in the light path. This, in and of itself, was of considerable importance, but many believe that the future of the phenomenon resides in the ability to carry intelligence from one point to the other in a volume greatly in excess (per unit of cross-section) of the capability of presently used communication carriers.

Similarly to presently used and common communication carriers, various types of couplings would enhance the value of light intelligence guiding fiber optic devices in terms of communications. For instance, end-to-end coupling, lateral coupling, branched coupling and tapped coupling with respect to fiber optic devices would be greatly supportive of the concept of replacing present day carriers with fiber optic devices. Their value in communications is diminished unless one fiber optic carrier could be conveniently fed into one or more others over great distances, without attendant losses.

Also, it has been found that three general classifications of fiber optic devices are useful in communications: multi-mode, graded index and single mode. The first two have relatively large core diameters and therefore are butt-coupled, but not very easily. Single mode fibers include the advantage of high band width, but also attendant small core diameter which makes coupling extremely difficult.

If, for example, the core diameter were three microns for a single mode construction, a misalignment of one micron would lead to a coupling loss of almost 30% in an end-to-end butt coupling. Also, a dust particle (typically one micron) would produce the same type of coupling loss. Furthermore, variations plus or minus 3% in outer diameter occur commonly in the fiber drawing process, and since a three micron core would be imbedded in approximately a 50 micron outside diameter cladding, a misalignment between cores of approximately 1.5 microns could occur, thus producing a coupling loss of approximately 50%.

Recognizing the above problems, various techniques have been tried, but none have proven to be a satisfactory and inexpensive solution to the problems mentioned above. For instance, various suggestions have been made in the literature concerning the lateral coupling of fiber optic devices wherein both cores are imbedded in the same cladding substrate. However, such devices are inherently lossy and therefore suitable for integrated optics circuits, but not for transmission over long distances.

Accordingly, a primary object of the present invention is to provide coupling structures for fiber optic devices, which make such devices useful in satisfying most communications requirements.

A further and more particular object of the present invention is to provide coupling structures for fiber optic devices for use in communications, which enable the use of free-standing fiber optic elements.

A still further and more particular object of the present invention is to provide coupling structures for free-standing, single mode fiber optic elements, wherein significant light losses at the point of coupling are avoided.

Still further objects of the present invention are to provide various fixtures and accessories useful in tuning and matching fiber optic elements for transmission and coupling in single and multiple modes.

Other objects of the present invention are to provide various fiber optic element structures which enable efficient and accurate coupling with other fiber elements.

Still other objects of the present invention are provided in fiber optic systems wherein coupling of fiber optic elements in a communications system take the form of either simple coupling fibers, branch fibers and tapped fibers for the purposes of coupling a fiber optic element to one or more other such elements.

These, and other objects of the present invention are provided in coupling devices for coupling light intelligence between fiber optic elements which feature a first fiber optic transmission element and a second fiber optic transmission element, each including a core and a cladding and means for coupling light intelligence from the first element to the second. Such means take the form of eccentric cores and cladding for one or both elements whereby tuning is accomplished by rotation until the respective cores coincide at a common rotation locus. Another form of coupling means includes the provision of the elements with portions of the cladding of each relatively more susceptible to etching and thereby with cores capable of selective proximity to the cladding periphery at points of coupling without the danger of contamination of such cores.

Also, such coupling means takes the form of coupling link fibers which are coupled to both elements, such as in cladding apertures thereof, wherein the core of each element is placed in or near the aperture to better couple with the coupling link. Furthermore, in all such structures and elements, techniques such as the use of stretching fixtures, bends and tapers are useful for tuning and enhancing the coupling.

Also, multi-core elements are provided using a single cladding for each element for use with a coupling link or otherwise to enable coupling in a communications system. Such structures are enhanced by the use of a thin fin optically connecting the cores of each element at the coupling point.

Fiber optic elements are also provided with elliptical cores for equalizing polarization modes and for equalizing coupling for such modes.

It is also the accomplishment of this invention to provide ion-exchange regions to convert cladding portions to core portions for the purposes of coupling by raising the index of refraction of such portions at coupling points and providing such structures with or without optically connecting fins between typical cores and cores provided by the ion-exchange technique.

Coupling blocks are also used to align abutting element cores and three or more cores are provided in certain structures to accomplish branching and tapping coupling of fiber optic elements.

Other objects, features and advantages of the present invention will become apparent by reference to the following, more detailed description of preferred, but nonetheless illustrative, embodiments of the present invention, with reference to the accompanying drawings, wherein.

Figure 2A:
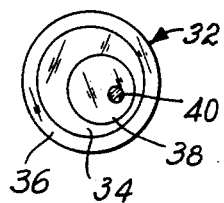
Figure 2:
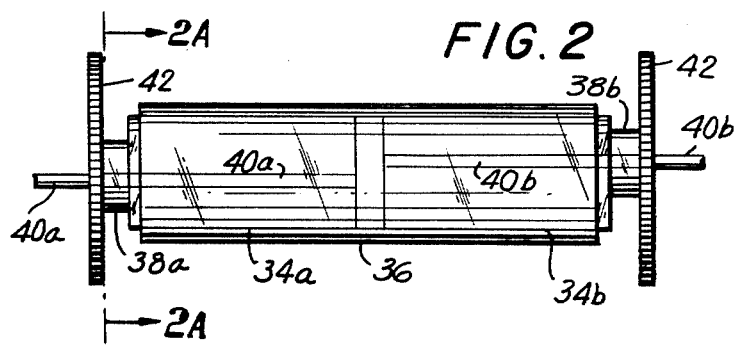
Figure 3:
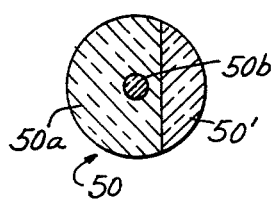
Figure 2B:
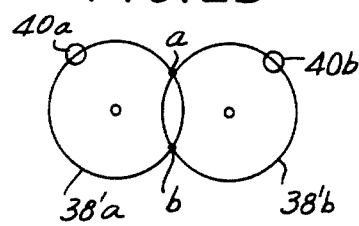
Figure 4:
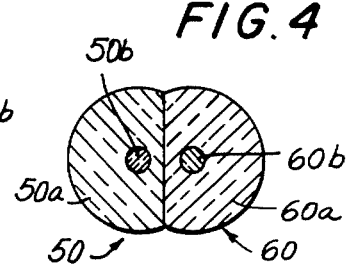
Figure 5A:
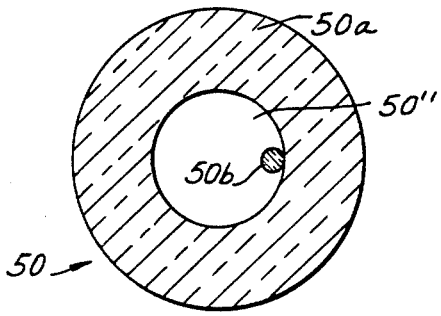
Figure 5B:
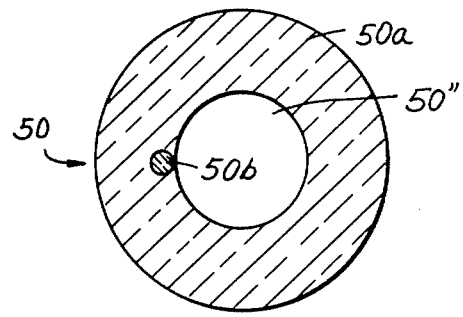
Figure 6:
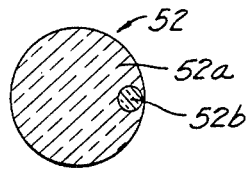
Figure 7:
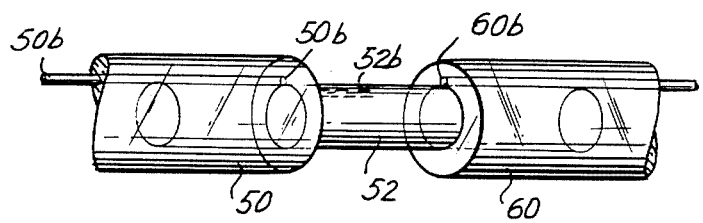
Figure 8:
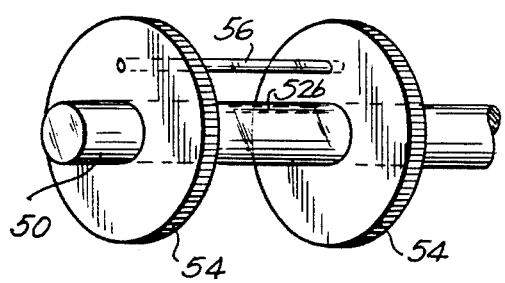
Figure 9:
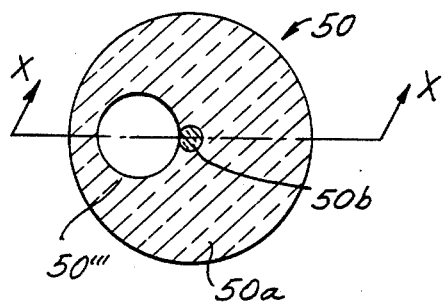
Figure 10:
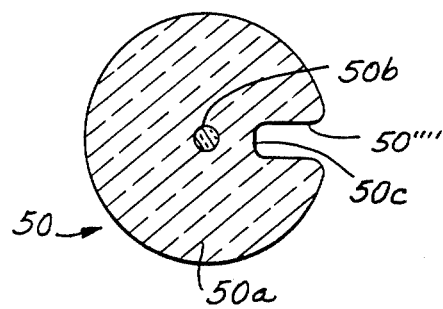
Figure 11:
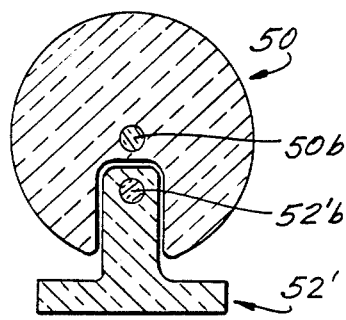
Figure 12:
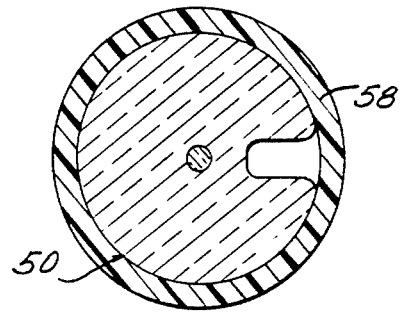
Figure 13:
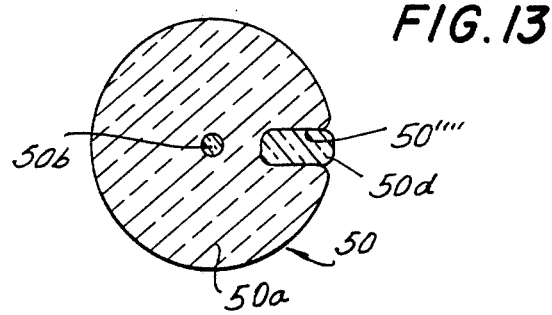
Figure 14:
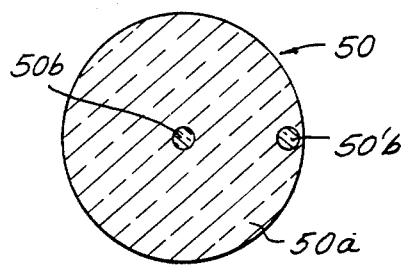
Figure 14A:
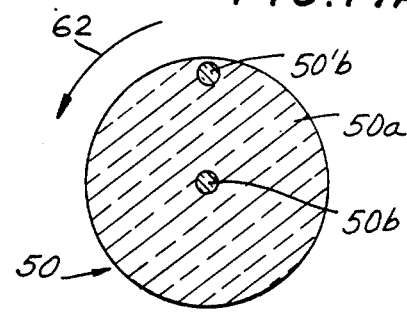
Figure 14B:
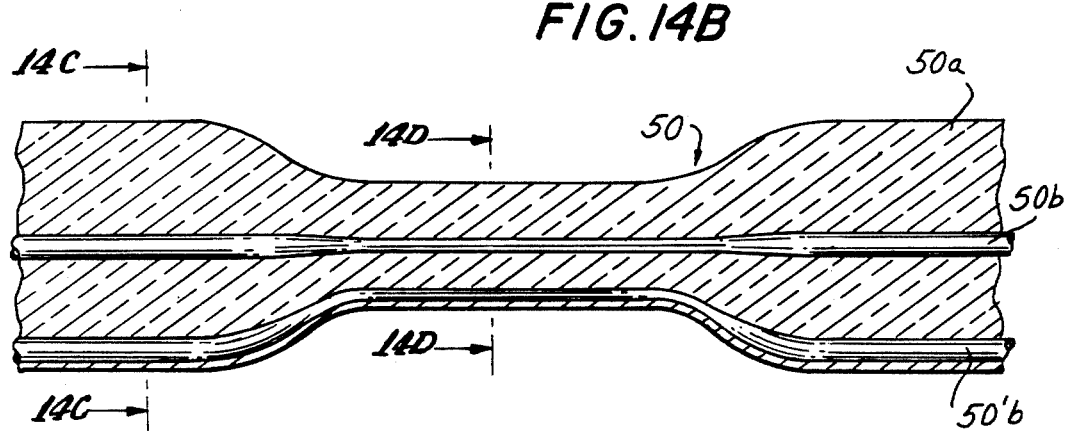
Figure 14C:
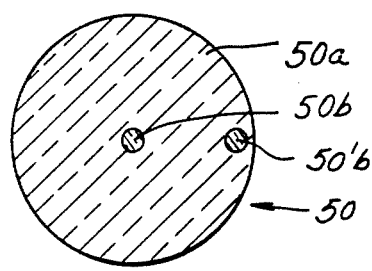
Figure 14D:
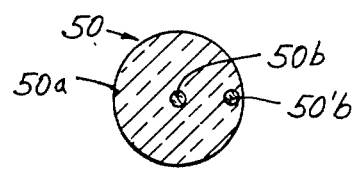
Figure 15:
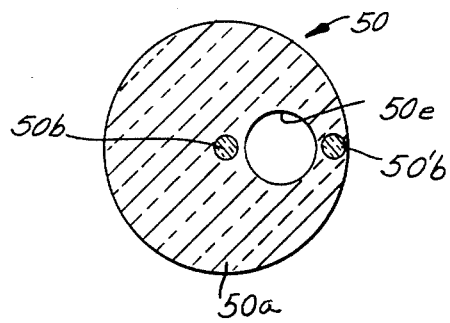
Figure 16A:
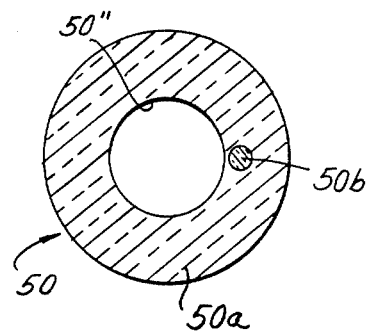
Figure 16B:
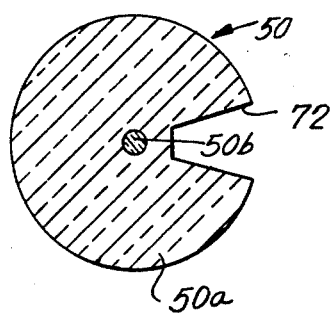
Figure 16C:
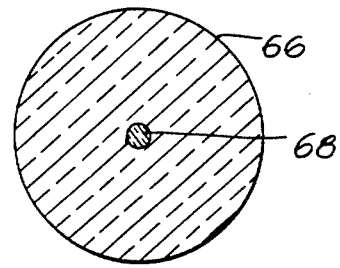
Figure 16D:
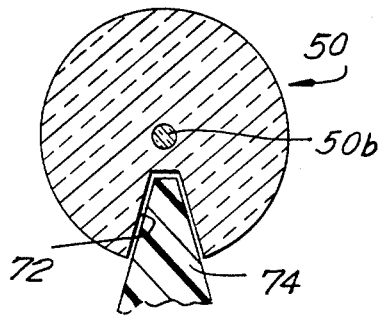
Figure 17:
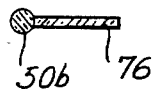
Figure 17A:
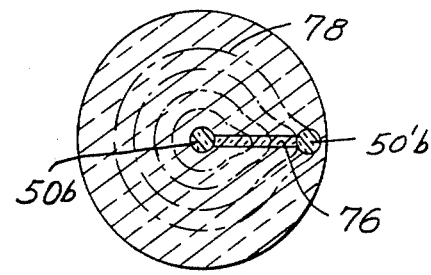
Figure 18:
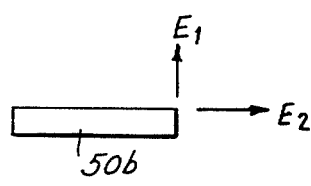
Figure 19:
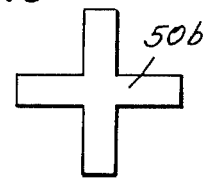
Figure 20:
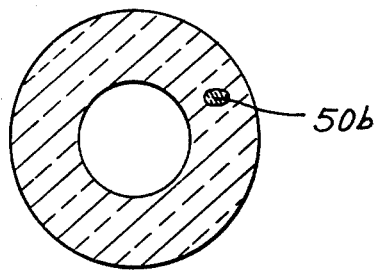
Figure 21:
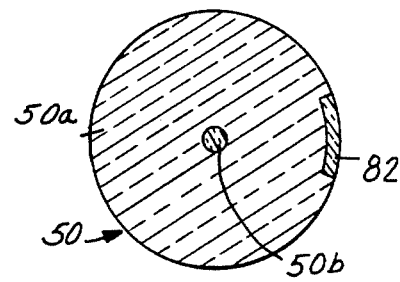
Figure 21A:
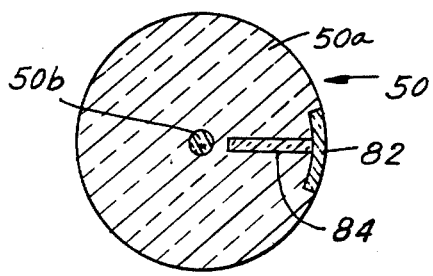
Figure 21B:
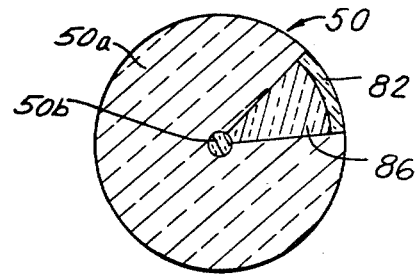

FIGS. 2, 2A and 2B are a front view, an end view and a schematic view showing a structure according to the present invention for coupling fiber element cores end-to-end with accuracy and with a tuning capability by providing a series of sleeves (claddings) for each coupled element, some of which sleeves (claddings) and the cores of which are eccentrically placed for rotation to a position of accurate coupling;

FIGS. 3 and 4 are end, sectional view representations showing a single and coupled fiber elements whereby a portion of the cladding is more susceptible to etching to enable greater proximity between cores for the purpose of coupling;

FIGS. 5A and 5B represent end, sectional views of fiber optic elements for receiving coupling link fibers, whereby the cores of such link fibers will be placed in greater proximity to the cores of such elements;

FIG. 6 illustrates a coupling link fiber in end, sectional view, useful with the structures of FIGS. 5A and 5B and otherwise in the present invention;

FIG. 7 is an isometric representation of the two fiber elements of FIGS. 5A and 5B coupled by means of the coupling link fiber of FIG. 6;

FIG. 8 is an isometric representation of a tuning fixture useful with the coupling arrangement of FIG. 7 and for the purpose of stretching a transmission fiber element of either FIG. 5A or FIG. 5B in order to provide matching propagation constants;

FIG. 9 is an end, sectional view of another embodiment of the present invention whereby a cladding aperture is made eccentric in a transmission fiber in order to provide the capability for tuning by means of horizontal bending thereof;

FIG. 10 illustrates yet another embodiment of the present invention in end, sectional view whereby a transmission fiber core is brought closer to the periphery of its cladding by means of a specialized cladding shape;

FIG. 11 is an end, sectional view of the transmission fiber of FIG. 10 coupled to either the coupling link or another transmission fiber, whereby the cores thereof are placed in proximity to each other for purposes of coupling;

FIG. 12 is an end, sectional view of the transmission fiber of FIG. 10, showing encapsulation thereof for the purpose of protecting such fiber against contamination;

FIG. 13 is an end, sectional view of the transmission fiber of FIG. 10, showing particularly the use of a glass key for use in protecting the core of the transmission fiber against contamination, which is replaceable by a liquid or resin to accomplish the same purpose;

FIGS. 14 and 14A illustrate another embodiment of the present invention, whereby a transmission fiber includes a pair of cores for purposes of coupling, FIG. 14A representing the twisting structure useful in tuning the fiber of FIG. 14;

FIGS. 14B, 14C and 14D show a front, sectional view, an end sectional view and a transverse, sectional view of a double core fiber, whereby a greater proximity for the cores is provided at coupling points by means of "necking down" the fiber selectively;

FIG. 15 is an end, sectional view of a structure useful in the embodiments of FIGS. 14-14D, whereby the cores are separated by a cladding aperture in order to decrease interaction between the cores;

FIGS. 16A and 16B are end, sectional views of alternative embodiments of the present invention, whereby single core fibers are shaped to enable end-to-end alignment for the purposes of coupling by means of a fixture, or the like, insertable to the cladding aperture of FIG. 16A and the keyway of FIG. 16B;

FIG. 16C is an end, sectional view of a fiber of the prior art without alignment structuring, and which is now used in the field for end-to-end coupling;

FIG. 16D is an end, sectional view showing the use of a fixture for purposes of alignment in conjunction with the transmission fiber of FIG. 16B;

FIGS. 17 and 17A are end, sectional views showing the adaptation of the embodiments of FIGS. 14 and 15 by means of a fin for enhancing coupling between the cores of a transmission fiber;

FIGS. 18, 19 and 20 are schematic representations for the purposes of describing the present invention with respect to mode splitting due to polarization;

FIGS. 21, 21A and 21B represent an embodiment of the present invention, in end, sectional views, whereby ion-exchange techniques adapt the structure of a transmission fiber to a coupling arrangement according to the present invention;

FIG. 22 is an isometric representation of a lateral coupling link comprising an alignment fixture having a trough;

FIG. 22A is an alternative to the embodiment shown in FIG. 22, in end, sectional view, whereby a top fixture is used with the embodiment of FIG. 22 and coupling core portions are provided both in the lower fixture and as a second core in the transmission fiber;

FIG. 22B is a graphical representation showing the variation of propagation constant over the length of a transmission fiber caused by tapering of a coupling block, as shown in FIG. 22C;

FIG. 23 illustrates the use of a double apertured, triple cored transmission fiber in end, sectional view, for the purpose of branch and tap coupling according to the present invention;

FIG. 24 shows an end, sectional view of a main transmission fiber useful in tapping arrangements according to the present invention;

FIG. 24A is an isometric view of a tapping arrangement according the present invention wherein the fiber of FIG. 24 is used as a main transmission element and double core fibers are used to tap information therefrom.

FIGS. 25 and 25A are front and end view representations of an alternative embodiment of the present invention; and FIGS. 26, 26A and 26B are representations of still another embodiment using multiple cores of a first transmission element for coupling.

Figure 1:
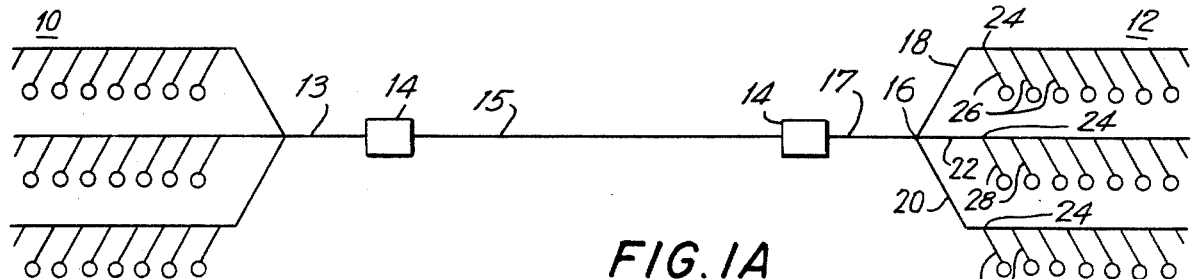
FIG. 1 is a schematic diagram of a typical communications network for the purposes of illustrating various coupling requirements as exist in the prior art.
Figure 1A:
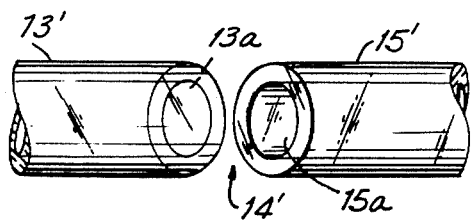
FIG. 1A is an isometric representation of the abuttment technique for coupling fibers as is used in the prior art.

FIGS. 1 and 1A exemplify the prior art in terms of communications systems and the manner in which such systems would today be adapted to fiber optics technology, respectively. FIG. 1 shows a simple communications system connecting two towns, generally designated 10, 12. Typical coupling is illustrated in FIG. 1 as including a "simple couple" 14, wherein elements 13, 15 have their ends prepared in advance and are joined end-to-end. Of course, a modification of the simple couple would be to not prepare the ends in advance, in which case, the transmission elements would be joined in what is commonly referred to as a "splice", but still end-to-end.

In a more sophisticated joining process, a "branch coupler" 16 involves the flow of communications along a main transmission element 17 and division into branches 18, 20, 22 by means of branch coupler 16.

On the other hand, a joinning of communications elements 18, 26 or 22, 28 or 20, 30 wherein one communications element has a small fraction of its energy tapped off in small fractions to other communications elements, is commonly referred to as a "tap" 24.

When tapping, as described above, there is a particular need for high efficiency of untapped transmissions, since many taps in series may be involved; but, of course, the other described coupling processes require efficiency as well. For instance, if 20% of the communications energy is lost at couples 14, a reasonably efficient communications system will nevertheless result. However, if 20% of the energy is lost in the untapped transmissions at each tap 24, it would be impossible to make 100 or more taps in series, which is probably a minimum requirement in communications systems.

In recent times, serious thought has been given to the use of fiber optics devices in communications systems such as that shown in FIG. 1. Coupling has, in some such cases, been recognized as the overriding problem. However, the present state-of-the-art has persisted in its use of multi-mode or graded index fibers, wherein coupling is basically of the end-to-end variety, as shown in FIG. 1A. In other words, a communications element in the form of fiber optics device 13' is joined to another fiber optics device 15' by means of an end-to-end joint or "butt" coupling, generally designated 14', wherein cores 13a and 15a are involved in an attempt at alignment. Firstly, multi-mode fibers have a relatively low band width; and secondly, a "butt" coupling is extremely difficult for single mode fibers as described in the introduction hereof, wherein losses as great as 30% to 50% could result in a misalignment of 1 micron in a three micron core, or a misalignment of 1.5 microns in a 50 micron outside diameter cladding, respectively.

Referring to FIGS. 2, 2A and 2B, the present invention involves a coupling structure for fiber optics elements in a communication system, wherein end-to-end coupling is provided with accuracy and with a fine positioning capability. Referring particularly to FIG. 2A, a first fiber optics transmission element, generally designated 32 is formed of a series of sleeves (claddings) whereby a middle sleeve (cladding) 34 is very accurately fitted to the inner diameter of an outer sleeve (cladding) 36. The inner diameter of middle sleeve (cladding) 34 is constructed to be eccentric with respect to the outer diameter of sleeve (cladding) 34. An inner cladding 38 has its outer diameter accurately fitted to the eccentric inner bore of middle sleeve (cladding) 34, with the bore of cladding 38 also eccentric with respect to the outer diameter of cladding 38. Core of fiber 40 is thereby located eccentrically with respect to element 32 as a whole and core or fiber 40 is then firmly fixed by epoxy or otherwise into the half 38a of split inner cladding 38 (FIG. 2). Middle sleeve (cladding) 34 is then cut into two lengths 34a, 34b and inserted into outer sleeve (cladding) 36. Middle claddings 34a, 34b are then rotated by means of knurled knobs 42 to that inner claddings 38a, 38b produce loci of overlapping circles 38'a, 38'b (FIG. 2B). At points a and b, the two fibers or cores 40a, 40b will be aligned. Of course, FIG. 2B represents a schematic representation only, wherein the fiber core is shown extremely small compared to the rotating sleeves (claddings) for purposes of clarity. Actually, the diameter of the circles produced by rotation will not be much larger than the cores themselves. In this way, the total excursion of the adjustment is no longer than necessary and the angular positioning is not overly critical.

From this point forth, in this specification, the first fiber element of a coupled communications array will be designated generally 50 (in all embodiments), the second fiber element will be designated generally 60, and further fiber elements 70, 80, etc., with each fiber element cladding having the suffix "a" for its reference numeral and the core having "b" as a suffix.

Referring to FIGS. 3 and 4, according to the present invention, a fiber element 50 is structured with a cladding 50a and a centrally located core 50b, as well as a portion 50' of the cladding more susceptible to etching than the balance of cladding 50a. After preparation in that way, portion 50' is etched away by means known in the art and element 50 is placed together with element 60 (FIG. 4), similarly prepared. Thus, cores 50b, 60b, are proximate for the purposes of lateral resonant coupling. Accordingly, the cores have greater proximity to the coupling point at the periphery of the cladding, but without the danger of contamination along the length where the portion 50' is not etched away.

Hereinafter, simple lateral coupling is referred to instead of lateral resonant coupling. In that way, coupling by optical contact should not be implied, but instead coupling due to interaction of evanescent waves.

Referring to FIGS. 5A-8, another embodiment of the present invention is shown wherein first fiber element 50 is structured with aperture 50" defined by cladding 50a. The core 50b of the element is placed on (FIG. 5A) or near (FIG. 5B) aperture 50" so that a coupling link fiber, generally designated 52, having cladding 52a and core 52b provides a better coupling as shown in FIG. 7, by means of an eccentrically placed core 52b. Of course, second fiber element 60 is prepared similarly to element 50 (FIGS. 5A or 5B) to thereby enable the coupling structure shown in FIG. 7.

FIG. 8 shows a stretching fixture useful with the embodiment of FIG. 7 wherein knobs 54 are arranged with first fiber element 50 in such a way as to tune the fiber and thereby enhance the coupling. The core 52b of the coupling link fiber 52 is made to have a propagation constant matching the cores of fiber elements 50, 60, but the match cannot be exact since the fiber elements 50, 60 vary in diameter by a few percent along their length due to drawing variations. To provide the structure of FIG. 7, coupling link fiber 52 is inserted to the apertures 50", 60" of fiber elements 50, 60 and rotated for alignment, with the depth of insertion being adjusted to give complete coupling, so that substantially all light is transferred to and from the coupling link fiber 52. A liquid or hardening resin can be used to lubricate the coupling link fiber 52 during this process. Thus, the stretching rig or fixture of FIG. 8 brings the cores 52b and 50b of the coupling link fiber and the first fiber element into a closer match in propagation constant. Likewise, the second fiber element 60 can be better matched by the use of the stretching fixture of FIG. 8. The stretching fixture itself includes not only stretch knobs 54, but also threaded element 56 to move knobs 54 closer together or cause them to move further apart.

FIG. 9 shows yet another embodiment of this invention, but one useful with a bending technique for purposes of tuning. Specifically, a first fiber element 50 (or any other element of this invention) is structured with an off-center aperture 50''' defined by cladding 50a and a centrally located core 50b thereby adjacent the aperture. A coupling link fiber (FIG. 6) is inserted to aperture 50''' and a bend is made in the "X" plane (FIG. 9), so that core 52b of coupling link fiber 52 will be stretched more than core 50b of the transmission or first element fiber 50. A match will thereby occur at some bending radius. Compression even occurs in some configurations for core 52b of coupling link fiber 52.

When a fiber core is stretched or compressed, its propagation constant will change. Also, if two cores are in a parallel relationship during bending, the light in the core with greater bending radius must travel further. Therefore, to maintain both cores in synchronism, the outer core must have a smaller propagation constant. Thus, in bending there are two effects, stretching and altering the path length for synchronism.

Still another way of matching is to taper coupling link fiber 52 slightly, so that at some point of insertion, a match will result, yet the taper is made so gradually, that a near match is maintained for a coupling length.

Referring to FIG. 10, yet another embodiment of the present invention is shown to include a transmission fiber element 50 (in almost all cases described herein, the shape or process recommended for a first transmission fiber element 50 is also applicable to a second transmission fiber element, to which the first will be coupled), having a cladding 50a defining a transverse notch 50'''' at the point of coupling, such that core 50b is thereby closer to the periphery 50c (at least at one portion of the periphery) of the cladding 50a. Accordingly, FIGS. 10-13 are to be considered together, whereby FIG. 11 shows the fiber element 50 of FIG. 10 coupled to a coupling link fiber 52', whereby core 50b is thereby in close proximity to core 52'b. FIG. 12 shows the fiber element 50 of FIG. 10 sheathed to prevent contamination, in an encapsulating element 58, which could be broken at the point of coupling or whereby the coupling link fiber 52' is made to conform to the outer diameter of fiber element 50, so that the encapsulating element is continuous. Also to prevent contamination, the embodiment of FIG. 13 is used for the fiber transmission element 50. In FIG. 13, a key 50d of glass or plastic equal to or less in index of refraction than that of the cladding 50a, is used. Similarly, notch 50'''' is filled with a suitable liquid or resin having low index of refraction (not shown) to prevent contamination (and perhaps as the guide to shaping a coupling link fiber previously discussed with reference to FIG. 12).

Referring collectively to FIGS. 14, 14A through 15, an embodiment of this invention is shown to include a fiber transmission element 50 having a pair of cores 50b, 50'b, a central one 50b for transmission and a peripheral one 50'b for coupling. Light will be transmitted through the bulk of the length of element 50 in the central fiber core 50b, and at the coupling point in the outer fiber core 50'b for purposes of coupling. The transfer is prevented along the transmission length by giving the peripheral core a different propagation constant from that of the central core. By bending cores can be brought to equality at the coupling region, but the degree of mismatch is made sufficient to prevent appreciable coupling during bends which the fiber undergoes along its length during normal use.

A set of reasonable dimensions for the embodiment of FIGS. 14-15 are as follows:

$\lambda$ = wavelength of light used = 0.9 microns
$d_1$ = core diameter = 2.7 microns
$d_2$ = peripheral core diameter = 2.9 microns
$D$ = outer diameter = 24 microns
$NA$ = numerical aperture = 0.2 microns No exact value for the coupling length for these dimensions is given, but it is probably between 10 and 25 centimeters. The bending radius required to give matching propagation constants is approximatey 3 millimeters.

An elaboration of the above-described design (FIG. 14) is structured as shown in FIGS. 14B, 14C and 14D, whereby the fiber transmission element 50 is elongated and diminished in cross-section by heat forming along a relatively short section. In this necked-down section, light will penetrate further into the cladding, because the cores are made smaller and will interact more strongly since the distance between cores is reduced. Thus, a greatly enhanced degree of coupling will occur. Of course, the propagation constants are still different for the two cores (actually the propagation constant varies less with core diameter as the core becomes smaller), so bending is still needed for maximum coupling. If the length of the attenuated section is properly chosen to transfer the light completely to the peripheral core 50'b, but not back again, as the light enters full diameter (the right-hand section of FIG. 14B) it will remain in the peripheral fiber, at least to a useful degree. Also, tuning is accomplished by means of twisting the element 50 while heat forming and further twisting as depicted by arrow 62 in FIG. 14A.

Another elaboration of the design shown in FIG. 14 can be provided by means of the embodiment of FIG. 15, wherein an aperture 50e isolates the two cores 50b, 50'b more effectively and decreases "scattering" from the central core to the peripheral core induced by "micro-bending". A recommended dimension for aperture 50e is 5 microns, and thereby produces a radically reduced coupling between the cores. At the coupling point, a liquid, a resin or a 5 micron glass plunger (not shown) of index of refraction at least equal to that of the cladding 50a, is injected for a length somewhat greater than the coupling length. The index of refraction of such an inserted material is made as great as possible without becoming effectively another core material, and the degree of coupling is thereby further increased in the coupling region, and hence the coupling length can be decreased. The big advantage of decreasing the coupling length is the decrease in precision of match for propogation constants which results.

Additionally, an elevation of the temperature of one or the other of the fiber elements causes permanent deformations. For instance, a rig or fixture was shown with reference to FIG. 8 for stretching the fiber. If the temperature is also elevated, the fiber element is permanently elongated and not just elastically stretched. To permit closer, more fixer proximity for coupling, the fiber element of FIG. 15 is heated sufficiently to shrink it (by surface tension) onto a glass plunger to be inserted to aperture 50e at the coupling point only. Still further, the fiber element can be twisted as suggested for FIG. 14A, while hot, to produce exact matching of propagation constants between the central and peripheral cores to form a slow helix around the center.

FIGS. 16A-16D illustrate an embodiment of the present invention for facilitated end-to-end coupling. In these representations, a geometric holding point is available closer to the core 50b for fiber transmission element 50 having a single core. In the conventional fiber (FIG. 16C), the nearest grasping surface 66 is 10 to 30 microns away from the core 68. Thus, + or −3% of the dimension acts to decrease the accuracy of coupling. In the tubular fiber element 50 of FIG. 16A, the core 50b is directly at the inner surface near aperture 50″. A mechanical pin (not shown) is used to couple two such fiber elements end-to-end, and they may be rotated for alignment and depressed to push the core against the pin and thereby take up any slack due to differences in dimensions between aperture 50″ and the pin. Likewise, a keyed fiber 50 (FIG. 16B) having a keyway 72 is useful for butt-coupling, whereby an alignment key 74 (FIG. 16D) is used to align core 50b in one fiber transmission element to another core in another fiber transmission element.

Along the same lines, but with slightly more complexity, light is transferred from a central core to a peripheral core as in FIG. 14 and then a butt-couple rather than a lateral couple accomplished. It is thereby possible to couple between a relatively small central core and a large, lower numerical aperture peripheral core. This is accomplished by using a lower index material for the peripheral core and adjusting the diameter to match the propagation constant of the central core. Inevitably, the larger diameter core will propagate light in a narrower cone angle. By using a larger peripheral core, it is easier to butt-couple because the dimensions are larger and because the core is peripherally located. However, the angular alignment becomes more critical, but this is a less significant problem. The narrower cone angle and larger diameter makes the coupling efficiency less sensitive to a gap between butted ends.

FIG. 17 shows a core 50b of a fiber transmission element with a thin fin 76 extending therefrom. The core is presumed to be of a dimension to conduct a single mode, and the fin has a cross-sectional dimension less than approximately one-third the diameter of the core. Light will thereby penetrate from the core along the fin, and the intensity thereof will be damped (approximately exponentially) as distance from the core 50b increases. When the fin is made thicker in cross-section, but of lower index than the core, yet higher than the cladding used, similar results are achieved. If the fin is not attached, there will still be an increased field penetration facilitated along the length of the fin, relative to the penetration that would be present if the fin were not used.

Constant field strength is represented by contours 78 with use of the fin 76 between cores 50b, 50′b, as shown in FIG. 17A. For purposes of lateral coupling, appreciable field strength in the region of core 50b is necessary, but it is not necessary or desireable to have significant field strength elsewhere, since field strength which could penetrate outside the fiber periphery could interact outside to produce absorption and scattering. Thus, fin 76 produces field strength where needed and desired.

Furthermore, FIGS. 18-20 illustrate the use in the present invention of cores 50b, which are not circular in cross-section. Circular cross-section is probably optimum for maximum transmission. However, cores of other shapes are useful. In a highly asymmetric geometry, propagation constant depends upon the polarization. For instance, FIG. 18 illustrates a core 50b wherein the propagation constant for $E_1$ will differ from that of $E_2$. In other words, a single mode fiber is really not single mode, but has two modes characterized by polarization in directions $E_1$, $E_2$. In the case of circular symmetry, these modes have identical propagation constants, but circular symmetry is too strong a requirement. Thus, the geometry of FIG. 19 could be used, wherein the geometry repeats itself with each 90° rotation. Therefore, the geometry of FIG. 19 has two modes of identical propagation constants.

With two propagation constants, a sharp signal pulse into the fiber will provide two separate pulses at the output end. The time separation will depend upon fiber length. One might hope to separate these two output pulses at the output but in a long fiber under actual use conditions, the two modes will scatter back and forth to produce one broadened pulse. This will limit the band width of signal transmission.

Even asymmetry outside the core, as in FIG. 5B, will create two distinct modes, though the separation in propagation constant will be less as the asymmetry is removed further from the core. FIG. 5B may be corrected or minimized with respect to separation by introducing another asymmetry such as by making the core 50b elliptical as in FIG. 20.

FIGS. 21-21B represent an ion-exchange technique for the present invention. Fiber transmission element 50 is structured with a central core 50b having a higher index of refraction than cladding 50a, as usual. The region 82 represents a glass or other suitable material used for ion exchange, but with an index of refraction approximately equal to the cladding index and less than the index of refraction of the core 50b. After drawing the fiber element 50, region 82 is ion-exchanged to increase its index of refraction and to provide a propagation constant equal to that of core 50b, but in a peripheral core. This ion-exchange is done only at the ends of the fiber for purposes of coupling, or at other coupling points. If region 82 existed along the length of the fiber, it would have to be very loosely coupled to central core 50b to prevent transfer of energy along the length, or there would be a necessity for unmatched propagation constants. This problem does not exist if region 82 is only used at the coupling point. If there were no "latent" region 82, a second core is produced by diffusing some dopant into the region or by evaporating on a layer of suitable index. Still further, a radial fin 84 (FIG. 21A) is used with a typical dimension of 0.5 microns thickness and a length of 10 to 20 microns. It could either touch the central core 50b or be separated therefrom as shown in FIG. 21A. The region 82 is typically 2 microns thick and 6 to 10 microns wide. Fin 84 increases the coupling between the two cores so that coupling length need not be too long. Similarly, a region 86 (FIG. 21B) is used and is given a lower ion concentration than region 82. The lower ion concentration causes region 86 to develop an index of refraction such that $n_{86}$ is less than the propagation constant of core 50b, but greater than the index of refraction of cladding 50a:

propogation constant of $50b = n_{50b} \cos \theta_{50b}$

Since $n_{86}$ is less than $n_{50b} \cos \theta_{50b}$, the evanescent wave will be damped radially in region 86, but not so rapidly damped as it would have been in the cladding. The ion concentration, and hence the "developed" index in region 86, is designed to give a reasonable coupling length of approximately 1 mm to 1 cm. When the wave length is 1 micron and the coupling length is 10,000 microns, the propagation constants at coupling must be matched to better than one part in ten thousand. To require much greater coupling lengths than 10 cm would be too much demand on the precision of all of the parameters involved in any of the designs herein.

Some of the methods of coupling described herein may be inconvenient to carry out in the field. In those cases, part of the end preparation is accomplished under laboratory conditions and the remainder in the field. For instance, cable is made in fixed or pre-determined lengths. Also, cable of 10 km., 5 km., 2 km., 1 km., ½ km. and ¼ km. is carried in stock and coupled as needed in the field. In this case, a fiber as shown in FIG. 21B is taken and the ion exchange performed on each end to get substantially complete transfer of light from region 82 to core 50b at the input end and core 50b to region 82 at the output end. Additionally, the end is rigged up with any amount of hardware to make the coupling easy in the field.

As an example, to couple fiber elements 50, 60 prepared according to FIG. 21B in the field, the fixture 92 of FIG. 22 is useful. A trough 93 is made with a coupling core 83 embedded in a glass or plastic of an index of refraction close to that of the fiber cladding 50a. This is done separately in the laboratory for both fiber element 50 and fiber element 60. Fixture 92 is epoxied onto the end of each fiber element to provide the proper angular orientation. Top fixture 94 (FIG. 22A) is used to apply contact pressure.

Also, the propagation constant of region 82 is measured accurately and a label attached to the end of the fixture. Furthermore, the coupling block (fixture) 92 is tapered so that the propagation constant of region 83 is larger at each end and smaller at the middle of the fixture (see FIG. 22B). Since the constant of each fiber is then known, where to place the fibers 50, 60 on the coupling block 92, is also known to provide good coupling.

The present invention also provides the capability to couple one transmission line to more than one other line. For instance, the fiber transmission element of FIG. 15 is adapted to include two peripheral cores 50'b, 50''b as shown in FIG. 23. Apertures 50e are used to insert suitable materials, so that both core 50'b and core 50''b are coupled to central core 50b, thereby causing half the energy to transfer to core 50'b and half to 50''b. The energy is then directed into two coupling link fibers inserted to apertures 50e and then to two other separate transmission fibers.

It is apparent that such a coupler could be used as a switch, so that light can be transferred to either core 50'b or core 50''b at will. This is accomplished by altering the degree of coupling by means of driving a plunger or column of liquid in and out of each aperture 50e or by detuning. As an example, if core 50'b and core 50''b are tuned slightly off, bending the fiber in one direction will tune to core 50'b and bending in the other direction will tune to core 50''b.

A multi-branch coupler 95 is made as shown in FIG. 24, wherein core 96b is near the surface of cladding 96a, making the fiber element link 96 unsuitable for long-distance transmissions. However, a series of branches 98, 102 can be taken off as shown in FIG. 24A. Each branch 98, 102 is formed in a double core arrangement so that the energy can be transferred from the peripheral cores 98'b, 102'b to the central cores 98b, 102b in order to provide long distance transmission through the branches. In this way, the branches are incompletely coupled to link 96, so that only a fraction of the energy goes into each branch; but the branches provide the long distance capability by means of transfer from their peripheral core to their central cores. Also, each coupler or branch connection is potentially a switch, whereby the switching action is accomplished by altering the degree of coupling or by detuning. This multiple branch coupler is short in length (perhaps only a few feet) and is of the type previously described herein at FIG. 1 (branch coupler 16). Of course, 96b, 98'b and 102'b are only schematically depicted in FIG. 24A and are meant to be continuous throughout the length of fibers 96, 98 and 102, respectively. Furthermore, FIG. 24A shows a compressed version, whereas, a central core for fiber 96 would be present in a non-compressed version where there are taps every tenth of a kilometer or in that order of magnitude.

To make a series of taps, as at 24 in FIG. 1, the cores are embedded deeper (relative to FIG. 24) into the cladding to provide better transmission and weaker coupling.

As an alternative, the energy is transmitted along a central core (FIG. 14) and partially coupled to a peripheral detuned core at each tap by bending to tune. Such an arrangement differs from a splice or a one-to-one coupling in that the bulk of the energy passes through the junction on the central core almost as if the tap did not exist. Thereby, 1% or less of the energy being transmitted is transferable to the peripheral core. The efficiency of transfer at a branch or tap is fairly low, but this is not considered to be crucial.

Additionally, a simple, but effective splice is made by the use of glass tubing 112 (FIG. 25), preferably flared or tapered at each end for ease of insertion, whose central section snugly fits two fibers to be butt-coupled. The two fiber elements 50, 60 to be butt-coupled are not necessarily the same size and the tubing 112 must only be slightly larger than the larger of the two elements. Tubing 112 is heated slightly so that it shrinks down on the fiber elements 50, 60 due to surface tension. The two fiber elements are thereby centered even if they are different in size.

An improvement results when tubing 112 has a somewhat lower softening temperature than the fiber elements. In certain circumstances, there is need to support the fiber elements 50, 60 and the tubing 112 at each end during softening to prevent bending or stretching. The heating should be uniform around the periphery to accomplish accurate centering.

Alternatively, when one or more rods 114 (FIG. 25A) of higher softening material are made an integral part of tubing 112, they will tend to hold the array srtraight during softening without external support. The material for rods 114 is Pyrex, simply laid on the surface of commercial soda lime tubing and drawn down. The Pyrex rods will adhere to and partially imbed in the tubing during drawing. With the construction shown in FIG. 25A, the tubing 112 will tend to be somewhat triangular in cross-section rather than circular, but such a configuration would be acceptable.

Furthermore, the foregoing basically involves a single fiber transmission element with one or more auxiliary fiber elements to facilitate coupling, such as in FIG. 14. Two or more first fiber transmission elements 50 are used according to the present invention and used independently when they are sufficiently separated such that there is no interaction in the transmission length desired. Even when two or more first fiber transmission element cores are used and are close enough to interact in the transmission length desired, they may still be used to carry the same signal, provided that they all have approximately the same propagation constant, and provided that the interaction does not perturb the individual propagation constant unduly. Either of these conditions will limit band width. It is known in the present art that, given a desired band width, the allowed variation in propagation constant may be calculated, and the allowed mode splitting calculated, and from that the tolerance of index of refraction and diameter and the minimum separation between cores determined.

For example, to achieve a difference in propagation constant of $10^{-4}$ between two cores with a numerical aperture of 0.15, operating barely at single mode, it is necessary to hold the index of refraction to $10^{-4}$, but the diameter need be held to only approximately $10^{-2}$. This may seem unreasonably demanding when fiber diameter commonly varies by 2 or $3 \times 10^{-2}$ in drawing; however, if the two cores are held to $10^{-2}$ in the "preform", they will vary synchronously in drawing.

As to spacing, the cores need be separated only by approximately one diameter to keep mode splitting down to $10^{-4}$. This is fairly independent of numerical aperture.

Whether the cores are being used independently for multiple signals, or together for a single signal, denser spacing is achieved if regions of lower index than the cladding insulate the cores.

FIG. 26 illustrates an array of cores 118 separated by hollow bores 122 or regions of reduced index of refraction.

When multiple cores 124 are used to transmit a single signal, they are provided with independent auxiliary cores for transfer coupling, or they may transfer into a common auxiliary core 126, as shown in FIG. 26A.

It is not necessary that the auxiliary core 126 be single mode. It is only necessary that there be one or more closely matched modes which resonate with the transmission cores 124 and that there be no other modes closely matched.

A particular geometry for FIGS. 26 and 26A is shown in FIG. 26B, wherein cores 124 couple into a single auxiliary core 126 in a configuration well suited for coupling into a laser diode.

Laser diodes typically have rectangular apertures with different angular spreads in the two dimensions. The rectangular cross section of the auxiliary transfer core 126 (FIG. 26B) is made to match the laser diode aperture and the propagation constant of the laser diode output is matched to the transmission core elements 124. As an approximation, the propagation constant of the laser diode $$\text{Propagation constant} = n \cos\theta = \sqrt{n^2 - \sin^2\theta_1 \sin^2\theta_2}$$

where n is the core element index, $\theta_1$ is the spread in one dimension of the laser beam and $\theta_2$ is the spread in the other dimension, $\theta$ being somewhat smaller than the extreme angular spread.

As may be seen from the foregoing, a communications coupling fiber is presented in order to provide the means by which fiber optics techniques are adapted to communications utility. The scope of the present invention is only to be limited by the following claims:

What is claimed is:

1. A coupling device for coupling light intelligence between fiber optic elements, comprising a first elongated fiber optic transmission element, a second elongated fiber optic transmission element, each fiber optic transmission element having ends, being single mode, being rotationally non-symmetric to provide means for enhanced, efficient, evanescent wave coupling in a selected portion of the periphery thereof to couple light intelligence from said first element to said second element and including a core of relatively high index of refraction and a cladding of relatively low index of refraction.

2. The invention according to claim 1 wherein said cladding includes a first portion of material intermediate said ends relatively unsusceptible, and a second portion of material relatively susceptible, to etching, whereby said susceptible portion is removed to thereby minimize the distance between said cores.

3. The invention according to claim 1 wherein said first element defines an annular ring of cladding material for further defining a cladding aperture of a given diameter greater than the diameter of its core, and said core of said first element being placed adjacent the periphery of said aperture for lateral coupling of said elements.

4. The invention according to claim 3 wherein said core of said first element is immediately without the periphery of said aperture.

5. The invention according to claim 1 wherein said first element includes a cladding of generally annular shape whose material has been removed between its core and the periphery of said cladding for lateral coupling.

6. The invention according to claim 5 wherein said second element defines a cladding shape suitable for insertion to the void left by said removed portion of said cladding of said first element.

7. The invention according to claim 5 wherein said first element is encapsulated in a protective sleeve.

8. The invention according to claim 5 wherein the void left by said removal is filled with a material similar in index of refraction to the material of said cladding of said first element.

9. The invention according to claim 1 wherein said first element further comprises a coupling core separated from said core of said first element to provide a double transfer from one core to the other and then to the third core.

10. The invention according to claim 9 wherein said first element is elongated and thereby diminished in cross-section for a portion of said first element along its propagation direction to thereby reduce the distance between said cores of said first element to enhance coupling therebetween.

11. The invention according to claim 9 wherein said first element is twisted about its axis of propagation to produce matching of propagation constants between said cores of said first element.

12. The invention according to claim 9 wherein said cladding of said first element is of generally annular shape, the aperture of which is between said cores of said first element.

13. The invention according to claim 1 wherein said elements are adapted and arranged to equalize the propagation constants of two polarization modes and said cores define generally the shape of an ellipse whereby a first mode propagates generally with its electric field vector along the horizontal axis of said ellipse and a second mode propagates generally with its electric field vector along the vertical axis of said ellipse.

14. The invention according to claim 1 wherein a lower fixture is provided with a trough into which said elements are placed for lateral coupling and an upper fixture being provided with a trough into which said elements are placed for lateral coupling.

15. The invention according to claim 1 wherein said device further comprises a third element having a core and cladding, said device coupling transmitted light from said first element to both said second and third elements and said first element comprising second and third cores of generally similar index of refraction and cross-sectional area to said core of said first element.

16. The invention according to claim 15 wherein an aperture is defined by said cladding of said first element between said core of said first element and said second core and an aperture is defined by said cladding of said first element between said core of said element and said third core.

17. The invention according to claim 15 wherein said second and third cores have propagation constants different from that of said core of said first element.

18. The invention according to claim 1 wherein said device further comprises a third element having a core and a cladding, one or more of said elements having an additional core, said device establishing light coupling between said first element and said second element and between said first element and said third element, said first element transmitting some of its propagated light to said second element at a first coupling point and then some of its remaining propagating light to said third element.

19. The invention according to claim 18 wherein coupling of transmissions is provided by means of lateral coupling.

20. The invention according to claim 19 wherein said first element includes a second core.

21. The invention according to claim 20 wherein propagated light is transferred to said second core by means of necking down of said first element prior to coupling the transmission to said second and third elements.

22. A coupling device for coupling light intelligence between fiber optic elements, comprising a first elongated fiber optic transmission element, a second elongated fiber optic transmission element, each fiber optic transmission element having ends, being single mode and including a core of relatively high index of refraction and a cladding of relatively low index of refraction and means for evanescent wave coupling of light intelligence from said first element to said second element, said device further comprising a coupling link fiber positioned for resonant lateral coupling to each of said cores and including a link core and a link cladding.

23. The invention according to claim 22 wherein said coupling link fiber includes a core material relatively closely spaced from a portion of the periphery of its cladding.

24. The invention according to claim 22 wherein a stretching fixture is attached to said first element for elongating said element to adjust the propagation constant of its core.

25. The invention according to claim 22 wherein said coupling link fiber defines a gradual taper and said first element cladding material defines an annular shape with an aperture into which said coupling link fiber protrudes.

26. The invention according to claim 22 wherein said cladding of said first element generally defines an annular shape with an aperture adjacent to which is placed said core of said first element and said coupling link fiber is inserted to said aperture, said coupling link fiber and said first element being bent in a direction, the plane of which includes said cores of said first element and said coupling link fiber, and generally at the point of coupling between said coupling link fiber and said first element for tuning.

27. A coupling device for coupling light intelligence between fiber optic elements, comprising a first fiber optic transmission element, a second fiber optic transmission element, each fiber optic transmission element including a core of relatively high index of refraction and a cladding of relatively low index of refraction, and means for coupling light intelligence from said first element to said second element, said first element including a cladding of generally annular shape whose material has been removed between its core and the periphery of said cladding, said device further comprising a coupling link fiber positioned for lateral coupling to each of said cores and including a link core and a link cladding and said coupling link fiber being shaped for insertion to the void left by said removed portion of said cladding of said first element and the core of said link fiber being positioned relatively close to the periphery of its cladding so that it is proximate to the core of said first element.

28. A coupling device for coupling light intelligence between fiber optic elements, comprising a first elongated fiber optic transmission element, a second elongated fiber optic transmission element, each fiber optic transmission element having ends, being single mode and including a core of relatively high index of refraction and a cladding of relatively low index of refraction and means for evanescent wave coupling of light intelligence from said first element to said second element, said first element including a cladding of generally annular shape whose material has been removed between its core and the periphery of said cladding for lateral coupling, said second element likewise including a cladding of generally annular shape whose material has been removed between its core and the periphery of its cladding, said second element abutting said first element to cause a unitary propagation direction therebetween and a key inserted to the voids left by removed material from the cladding of said first and second elements to align the cores of said first and second elements.

29. A coupling device for coupling light intelligence between fiber optic elements, comprising a first elongated fiber optic transmission element, a second elongated fiber optic transmission element, each fiber optic transmission element having ends, being single mode and including a core of relatively high index of refraction and a cladding of relatively low index of refraction and means for evanescent wave coupling of light intelligence from said first element to said second element, said first element including a cladding of generally annular shape whose material has been removed between its core and the periphery of said cladding for lateral coupling, said second element likewise including a cladding of generally annular shape whose material has been removed between its core and the periphery of its cladding, said second element abutting said first element to cause a unitary propagation direction there-between and a fixture inserted to the voids left by removed material from the cladding of said first and second elements to align the cores of said first and second elements.

30. A coupling device for coupling light intelligence between fiber optic elements, comprising a first elongated fiber optic transmission element, a second elongated fiber optic transmission element, each fiber optic transmission element having ends, being single mode and including a core of relatively high index of refraction and a cladding of relatively low index of refraction and means for evanescent wave coupling of light intelligence from said first element to said second element, said first element further comprising a coupling core separated from said core of said first element to provide a double transfer from one core to the other and then to the third core, said first element further comprising a thin fin optically connecting said cores of said first element and of an index of refraction higher than the index of refraction of said cladding of said first element.

31. A coupling device for coupling light intelligence between fiber optic elements, comprising a first fiber optic transmission element, a second fiber optic transmission element, each fiber optic transmission element including a core of relatively high index of refraction and a cladding of relatively low index of refraction, and means for coupling light intelligence from said first element to said second element, the claddings of said first and second elements each defining a region proximate the peripheries thereof which are ion-exchanged to increase index of refraction to a level similar to that of said cores of said first and second elements proximate the point where said elements are coupled.

32. The invention according to claim 31 wherein said elements each include a fin extending generally from the cores of said elements to the ion-exchange regions thereof, said fin having an index of refraction greater than that of said claddings and such that its propagation constant is less than the propagation constant of said cores.

33. A coupling device for coupling light intelligence between fiber optic elements, comprising a first fiber optic transmission element, a second fiber optic transmission element, each fiber optic transmission element including a core of relatively high index of refraction and a cladding of relatively low index of refraction, and means for coupling light intelligence from said first element to said second element, wherein a lower fixture is provided with a trough into which said elements are placed for coupling, a coupling core region being provided in the trough, and imbedded therein, said coupling core region having an index of refraction higher than that of the claddings of said elements and said elements each including a second core positioned proximate said coupling core region when said elements are inserted to said trough.

34. A coupling device for coupling light intelligence between fiber optic elements, comprising a first fiber optic transmission element, a second fiber optic transmission element, each fiber optic transmission element including a core of relatively high index of refraction and a cladding of relatively low index of refraction, and means for coupling light intelligence from said first element to said second element, said device further comprising a coupling block upon which said elements rest, said elements each including a second core of higher index of refraction than the claddings of said elements and said coupling block includes a coupling core positioned adjacent to said second cores.

35. A coupling device for coupling light intelligence between fiber optic elements, comprising a first elongated fiber optic transmission element, a second elongated fiber optic transmission element, each fiber optic transmission element having ends, being single mode and including a core of relatively high index of refraction and a cladding of relatively low index of refraction and means for evanescent wave coupling of light intelligence from said first element to said second element, said first fiber optic transmission element comprising a plurality of cores separated by regions of lower index of refraction than said cladding, said first fiber optic transmission element further comprising an auxiliary core into which a single signal transmitted through said plurality of cores is transferred for coupling to said second fiber optic transmission element.

36. The invention according to claim 35 wherein said second fiber optic transmission element is a laser diode, having an aperture and an output of a certain propagation constant, the cross section of said auxiliary core is matched to that of said plurality of cores.

37. A coupling device for coupling light intelligence between fiber optic elements, comprising a first elongated fiber optic transmission element, a second elongated fiber optic transmission element, each fiber optic transmission element having ends, being single mode and including a core of relatively high index of refraction and a cladding of relatively low index of refraction and means for evanescent wave coupling of light intelligence from said first element to said second element, said device further comprising a third elment having a core and cladding, said device coupling transmitted light from said first element to both said second and third elements and said first element comprising second and third cores of generally similar index of refraction and cross-sectional area to said core of said first element, said second and third cores having propagation constants different from that of said core of said first element, means being included for altering the propagation constant of at least one of said cores for purposes of tuning to accomplish lateral coupling.

38. The invention according to claim 37 wherein said means for altering are bending means.

39. A coupling device for coupling light intelligence between fiber optic elements, comprising a first elongated fiber optic transmission element, a second elongated fiber optic transmission element, each fiber optic transmission element having ends, being single mode and including a core of relatively high index of refraction and a cladding of relatively low index of refraction and means for evanescent wave coupling of light intelligence from said first element to said second element, said device further comprising a third element having a core and a cladding, one or more of said elements having an additional core, said device establishing light coupling between said first element and said second element and between said first element and said third elment, said first element transmitting some of its propagated light to said second element at a first coupling point and then some of its remaining propagating light to said third element, coupling of transmissions being provided by means of lateral coupling, said first element including a second core, propagated light being transferred to said second core by means of tuning prior to coupling the transmission to said second and third elements.

40. An elongated fiber optics device comprising a core of relatively high index of refraction, a cladding of relatively low index of refraction and a longitudinal aperture, wherein said aperture is of a cross-sectional dimension larger than that of said core and said core is located, cross-sectionally, proximate to said aperture for purposes of coupling light propagated within said core, and said device further comprising a second core of an index of refraction higher than that of said cladding.

41. A coupling means for coupling light intelligence to an elongated fiber optic transmission element, comprising an elongated fiber optic transmission device having ends, being single mode, being rotationally nonsymmetric to provide means for enhanced, efficient, evanescent wave coupling in a selected portion of the periphery thereof to couple light intelligence from said device to said element and including a core of relatively high index of refraction and a cladding of relatively low index of refraction, said core being proximate to only a portion of the outer periphery of said cladding and substantially smaller, cross-sectionally, than said cladding.

42. The invention according to claim 41 wherein said core is eccentrically located with respect to said cladding.

43. The invention according to claim 41 wherein said cladding is notched, with said core located at the base of said notch.

44. A fiber optics device comprising a pair of single mode cores of relatively high indices of refraction, a cladding of relatively low index of refraction and a fin extending cross-sectionally between said cores for providing interaction between said cores.

45. A fiber optics device comprising a core of relatively high index of refraction, a cladding of relatively low index of refraction, said cladding including a portion whose index of refraction is increasable by ion-exchange to form a region of coupling and to provide a second core, a fin being provided between said core and said portion for cross-sectionally coupling light therebetween.

* * * * *